March 19, 1935. A. HASLAUER 1,995,178

VACUUM TUBE ELECTRODE

Filed Jan. 17, 1934

INVENTOR
ADOLF HASLAUER
BY
ATTORNEY

Patented Mar. 19, 1935

1,995,178

UNITED STATES PATENT OFFICE 1,995,178

VACUUM TUBE ELECTRODE

Adolf Haslauer, East Orange, N. J.

Application January 17, 1934, Serial No. 706,916

10 Claims. (Cl. 250—27.5)

This invention relates to new and useful improvements in vacuum tube electrodes.

The invention has for an object the construction of a so called screen grid of a screen grid audion wherein the screen grid comprises a cylindrical body and an end closure secured together in a novel fashion.

In the past it has been customary to construct screen grids comprising a cylindrical body and an end closure by soldering or clamping the edges of the closure and cylindrical body together. In cases where soldering was resorted to the construction involved great expense in that this was mainly a hand operation. In cases where clamping of the edges was resorted to, these constructions did not take into account the fact that the screen grid is heated during manufacture and becomes heated, when in use, and expansion due to these heats tends and does loosen and disconnect the two parts thereof.

This invention particularly proposes constructing the junction between the metal closure member and the cylindrical body in such a manner as not to be affected by the heat produced by the vacuum tube during operation.

Still further the invention particularly proposes an arrangement whereby the edge of the cylindrical body is first reinforced by a beaded construction which in addition acts to enlarge the edge so that the closure member may be satisfactorily connected therewith in a manner not to come apart during heating or handling of the electrode. Further the invention proposes forming the closure member with a bent area to further hold the edge of the cylindrical body from collapsing.

Still further the invention proposes forming the edge of the cylindrical body in a manner so as to be capable of readily receiving the edge of the closure to firmly clamp these parts together in a superior manner than heretofore.

Still further the invention proposes the construction of an article as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
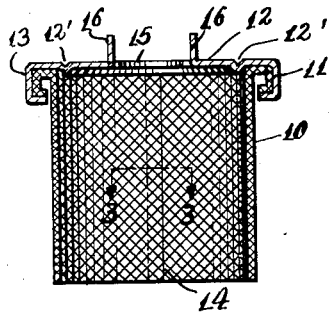
Fig. 1 is a vertical sectional view of a screen grid constructed according to this invention.
Figure 2:
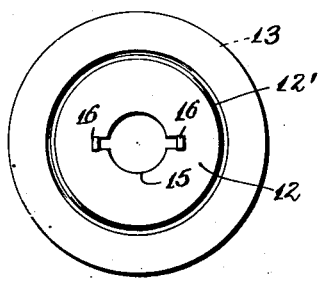
Fig. 2 is a plan view of Fig. 1.
Figure 3:
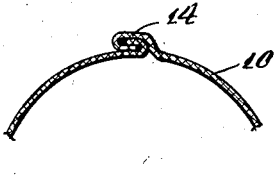
Fig. 3 is a horizontal sectional view taken on the line 3—3 of Fig. 1.

The screen grid according to this invention comprises a perforated sheet metal or screen cylinder 10 having a turned edge 11 on one end serving as a reinforcement to stiffen said end, and a metal closure member 12 over said end and having its edge 13 turned over said reinforcement edge. The cylinder 10 is formed from a sheet of material bent into cylindrical form and having its edges 14 interengaged by bending the ends upon each other as clearly illustrated in Fig. 3. The closure member 12 is formed with a central opening 15 from which prongs 16 extend upwards by means of which the screen grid may be mounted upon suitable parts in the audion.

The turned edge 11 is formed in a particular manner in which the cross section is substantially square and comprises a top continuation from the upper edge of the cylinder 10, a vertical continuation from the outer edge of the top continuation and a horizontal inward extending continuation from the bottom of said vertical continuation. This particular cross section produces a very stiff upper edge for the cylindrical member which customarily is formed from soft metal such as aluminum. The advantage of reinforcing the edge lies in the fact that the possibility of collapsing the upper end of the cylinder during handling or use is thus reduced if not entirely eliminated.

The bent edge 13 of the closure member 12 extends over the top continuation of the turned edge 11, then extends downwards over the side continuation of the turned edge 11 and finally inwards under the bottom inward extended portion of the turned edge 11. An indented area 12' in the closure member 12 engages against the reinforced end of the cylinder to further reinforce the end of the cylinder. With this arrangement the junction between the cylinder and the closure member is such as to hold these parts together mechanically as well as electrically. If during use the closure 12 becomes heated and expands more than the cylinder 10, because of the inturned bottom edges of the turned edges 11 and the edge 13 of the closure, disconnection of these parts is impossible.

Figure 4:
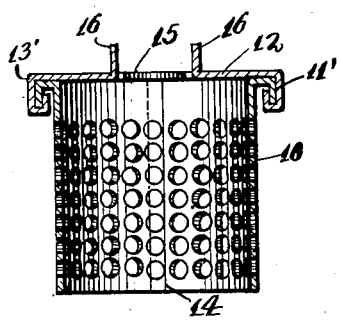
Fig. 4 is a vertical sectional view of a screen grid according to a modification of this invention.
Figure 5:
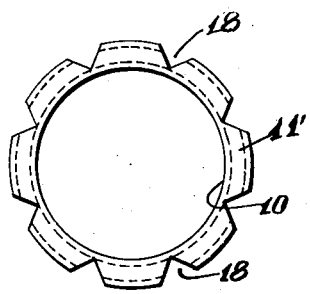
Fig. 5 is a plan view of the cylindrical body used in Fig. 4, illustrated per se.

In Figs. 4 and 5 a modified form of the invention has been disclosed wherein a different structure is provided for holding the closure member and the cylinder together. The cylinder 10 is shown provided with a top turned edge 11' and comprises a top horizontal continuation from the top of the cylindrical member and connecting with a side continuation extending downwards only. The closure member 12 has an edge 13' which is bent downwards outside of the side continuation of the bent edge 11' and then around up over the bottom edge of the side continuation. With this arrangement the closure 12 cannot possibly be disconnected from the cylindrical member during handling or during use when there is expansion due to the operation of the audion tube.

In practice it will be found that the side continuation of the edge 11' will necessarily have to be spaced materially from the outer face of the cylinder 10 in order to allow the edge of the turned edge 13' to engage the back side thereof. Since the metal of the cylinder 10 could not possibly expand so great a distance, it is necessary to form the upper end of the cylinder member 10 with a plurality of cuts 18 around its periphery. These cuts will divide off segmental portions of the turned edge 11' so that any desired amount of turning may be produced. The closure member 12 in addition to closing the upper end of the cylinder 10 also covers all of the slots 18 so that in the completed article these slots are not readily viewable.

Figure 6:
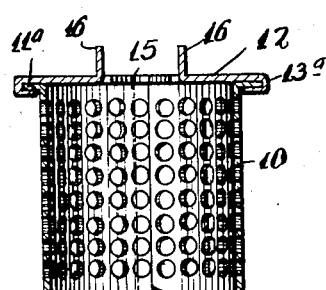
Fig. 6 is a sectional view of another screen grid constructed according to a still further modified form of this invention.
Figure 7:
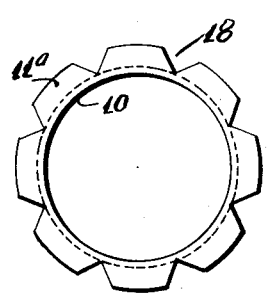
Fig. 7 is a plan view of the cylindrical body used in Fig. 6 illustrated per se.

In Figs. 6 and 7 another embodiment of the invention has been disclosed wherein the cylinder 10 is provided with a radially outturned top edge 11ª. This top edge is formed with a plurality of slits 18 for the purpose of not relying upon the expansion of the metal to allow the outturning. With this arrangement it is possible to extend the outturned edge 11ª to any desired degree. A closure 12 is mounted upon the cylinder 10 and has a turned edge 13ª which extends around the outer edge of the outturned edge 11ª. With this arrangement the edges 11ª and 13ª may engage each other for a substantially radial distance so that irrespective of any difference in expansion between the closure member and the cylinder these edges will still engage and hold each other.

Figure 8:
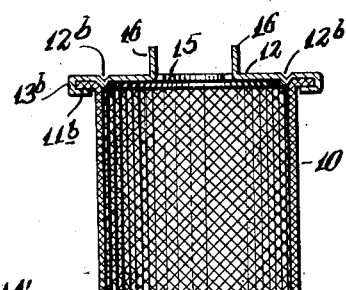
Fig. 8 is a sectional view of another screen grid constructed according to a still further modified form of this invention.

In Fig. 8 another embodiment of the invention has been disclosed wherein the cylinder 10 is provided with a radially outturned top edge 11ᵇ of a size permitted by the expanding qualities of the material so that radial slits such as 18 are not necessary. A closure 12 is mounted upon the cylinder 10 and has a turned edge 13ᵇ which extends around the outturned edge 11ᵇ. In addition the closure 12 is provided with an indented area 12ᵇ in intimate contact with the inner portion of the outturned edge 11ᵇ. This indented area is of circular shape and serves to hold the upper edge of the cylinder 10 reinforced against possibly being caved in during handling or in use. Still further this construction is such as to be rigid mechanically and satisfactory electrically during use irrespective of the temperature to which it may be subjected.

Figure 9:
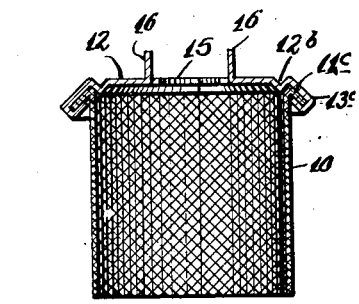
Fig. 9 is a sectional view of still another screen grid constructed according to a still further modification of this invention.

In Fig. 9 another embodiment of the invention has been disclosed which is very similar to that illustrated in Fig. 8 except for the fact that the edges 11ᶜ of the cylinder 10 is extended downwards at an inclination. The edge 13ᶜ of the closure 12 is also extended downwards at an angle and bent around the edge 11ᶜ. In other respects this form is similar to the previous form and similar parts may be recognized by corresponding reference numerals.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:—

1. In a vacuum tube electrode, a junction between a cylinder and closure member, comprising a metal material cylinder having a turned edge on one end serving as a reinforcement to stiffen said end, and a metal closure member over said end, having an edge turned over said reinforced edge.

2. In a vacuum tube electrode, a junction between a cylinder and closure member, comprising a metal material cylinder having a turned edge on one end serving as a reinforcement to stiffen said end, and a metal closure member over said end, having an edge turned over said reinforced edge, said turned edge of the cylinder comprising a top horizontal continuation joining with a downward extended vertical continuation in turn joining with an inturned bottom horizontal continuation.

3. In a vacuum tube electrode, a junction between a cylinder and closure member, comprising a metal material cylinder having a turned edge on one end serving as a reinforcement to stiffen said end, and a metal closure member over said end, having an edge turned over said reinforced edge, said turned edge of the cylinder comprising a top horizontal continuation joining with a downward extended vertical continuation in turn joining with an inturned bottom horizontal continuation, and the edge of said closure member extending down upon the outer face of said side continuation and under the bottom face of said inturned bottom continuation.

4. In a vacuum tube electrode, a junction between a cylinder and closure member, comprising a metal material cylinder having a turned edge on one end serving as a reinforcement to stiffen said end, and a metal closure member over said end, having an edge turned over said reinforced edge, the turned edge of said cylinder comprising a top horizontal continuation connecting with a side vertical continuation.

5. In a vacuum tube electrode, a junction between a cylinder and closure member, comprising a metal material cylinder having a turned edge on one end serving as a reinforcement to stiffen said end, and a metal closure member over said end, having an edge turned over said reinforced edge, the turned edge of said cylinder comprising a top horizontal continuation connecting with a side vertical continuation, and the edge of said closure member extending down upon the outer face of said side continuation around the bottom edge thereof and upwards upon the inner face of said side continuation.

6. In a vacuum tube electrode, a junction between a cylinder and closure member, comprising a metal material cylinder having a turned edge on one end serving as a reinforcement to stiffen said end, and a metal closure member over said end, having an edge turned over said reinforced edge, the turned edge of said cylinder comprising a top horizontal continuation connecting with a side vertical continuation, and the edge of said closure member extending down upon the outer face of said side continuation around the bottom edge thereof and upwards upon the inner face of said side continuation, said turned edge of said cylinder being formed with a plurality of slits for the purpose of eliminating the necessity of the metal stretching during the turning thereof.

7. In a vacuum tube electrode, a junction between a cylinder and closure member, comprising a metal material cylinder having a top outward turned radial edge serving as a reinforcement to stiffen the end thereof, and a closure member over said end and having an edge turned over said outward extending edge.

8. In a vacuum tube electrode, a junction between a cylinder and closure member, comprising a metal material cylinder having a top outward turned radial edge serving as a reinforcement to stiffen the end thereof, and a closure member over said end and having an edge turned over said outward extending edge, the outward extending edge of said cylinder being formed with a plurality of peripheral slits to eliminate the necessity of the metal stretching and thus allowing a large size for said edge.

9. In a vacuum tube electrode, a junction between a cylinder and closure member, comprising a metal material cylinder having a turned edge on one end serving as a reinforcement to stiffen said end, and a metal closure member over said end, having an edge turned over said reinforced edge, and formed with an indented portion encircling the inner area of the turned edge of said cylinder for further reinforcing the end of the cylinder.

10. In a vacuum tube electrode, a junction between a cylinder and closure member, comprising a metal material cylinder having a turned edge on one end serving as a reinforcement to stiffen said end, and a metal closure member over said end, having an edge turned over said reinforced edge, and formed with an indented portion encircling the inner area of the turned edge of said cylinder for further reinforcing the end of the cylinder, the turned edges of the cylinder and closure member being bent downwards at an inclination.

ADOLF HASLAUER.